United States Patent
Chang

(10) Patent No.: US 7,226,103 B2
(45) Date of Patent: Jun. 5, 2007

(54) GLOVE BOX FOR PREVENTING RECEIVED ARTICLES FROM BEING EJECTED THEREFROM

(75) Inventor: Sug-Dae Chang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 34 days.

(21) Appl. No.: 11/157,940

(22) Filed: Jun. 22, 2005

(65) Prior Publication Data

US 2006/0012204 A1    Jan. 19, 2006

(30) Foreign Application Priority Data

Jul. 14, 2004   (KR)   ............... 10-2004-0054772

(51) Int. Cl.
*B60R 7/06* (2006.01)
(52) U.S. Cl. .................................. 296/37.12
(58) Field of Classification Search ............. 296/37.12
See application file for complete search history.

(56) References Cited

U.S. PATENT DOCUMENTS

| 3,132,892 | A | * | 5/1964 | Stevens | 296/37.12 |
| 4,355,837 | A | * | 10/1982 | Shimizu et al. | 296/37.12 |
| 4,902,061 | A | * | 2/1990 | Plavetich et al. | 296/37.12 |
| 5,520,313 | A | * | 5/1996 | Toshihide | 224/539 |
| 6,129,401 | A | * | 10/2000 | Neag et al. | 296/37.6 |
| 6,135,530 | A | * | 10/2000 | Blaszczak et al. | 296/37.8 |
| 6,899,364 | B2 | | 5/2005 | Park et al. | |
| 2005/0218681 | A1 | * | 10/2005 | DePue et al. | 296/37.12 |

FOREIGN PATENT DOCUMENTS

| KR | 10-2004 0021904 | 3/2004 |
| KR | 10-2004 0035927 | 4/2004 |

OTHER PUBLICATIONS

English language Abstract of KR 10-2004-0021904.
English language Abstract of KR 10-2004-0035927.

* cited by examiner

*Primary Examiner*—Dennis H. Pedder
(74) *Attorney, Agent, or Firm*—Greenblum & Bernstein, P.L.C.

(57) ABSTRACT

Disclosed herein is a glove box for preventing received articles from being ejected from the glove box. The glove box comprises a receiving part opened or closed in a front side of the glove box about a hinge part provided at a lower portion of the glove box and having an inner receiving space formed in the receiving part to receive articles, a front cover formed on a front side of the receipt part, and a secondary cover to cover one side of an upper portion of the glove box in order to prevent the receiving articles from being ejected from the receiving part. The glove box can prevent the received articles from being ejected through the opened upper portion of the receiving part to the outside due to an impact, caused by vibration, collisions, and the like, during driving.

6 Claims, 3 Drawing Sheets

GLOVE BOX FOR PREVENTING RECEIVED ARTICLES FROM BEING EJECTED THEREFROM

RELATED APPLICATIONS

The present disclosure relates to subject matter contained in Korean Application No. 10-2004-54772, filed on Jul. 14, 2004, which is herein expressly incorporated by reference its entirety.

BACKGROUND OF THE INVENTION

1. Field of the Invention

The present invention relates to a glove box for preventing received articles from being ejected therefrom, and, more particularly, to a glove box, designed to have a secondary cover equipped to an upper portion of a receiving part in order to prevent received articles from being ejected from the receiving part to the outside by virtue of an impact during driving.

2. Description of the Related Art

In general, a glove box for use in a vehicle is equipped to one side of an instrument panel, and has a receiving space formed therein for receiving small articles and the like.

A conventional glove box for preventing received articles from being ejected therefrom will now be described with reference to FIG. 1.

Referring to FIG. 1, a conventional glove box 1 comprises a front cover 5, and a receiving part 3 connected to the front cover 5 to define an inner space in the receiving part 3. The glove box 1 is hinged to an instrument panel 9 by means of a hinge 7, so that the glove box 1 can open or close an opening part of the instrument panel 9.

With such a construction, there is a problem in that, since the receiving part 3 of the convention glove box 1 is opened at an upper portion thereof, articles received within the receiving part 3 can be ejected to the outside through the upper portion of the receiving part upon application of an impact to the glove box 1 caused by outside factors, such as vibration, collision, and the like, during driving.

SUMMARY OF THE INVENTION

The present invention has been made to solve the above problems, and it is an object of the present invention to provide a glove box, designed to prevent articles received within a receipt part of the glove box from being ejected to the outside through an opened upper portion of the receipt part due to an impact during driving.

In accordance with an aspect of the present invention, the above and other objects can be accomplished by the provision of a glove box, comprising: a receiving part opened or closed on the front side of the glove box about a hinge part provided at a lower portion of the glove box and having an inner receiving space formed in the receiving part to receive articles; a front cover formed on a front side of the receiving part; and a secondary cover to cover one side of the upper portion of the glove box in order to prevent the received articles from being ejected from the receiving part.

The secondary cover may be integrally formed to the receiving part by injection molding, and include a hinge connection having bent grooves formed at both outer sides of the secondary cover, such that the secondary cover rotates about the hinge connection to cover the one side of the upper portion of the glove box.

The receiving part may have a fastening bar provided in the longitudinal direction to an upper end of the receiving part, and the secondary cover may have a hinge holder formed by winding one end of the secondary cover to define an insertion space opened at one side of the hinge holder, such that the hinge holder of the secondary cover can be hinged to the fastening bar.

The receiving part may have latching rims protruding at both sides of the receiving part, and the secondary cover may have hook-shaped elastic protrusions formed at both sides of the secondary cover to be elastically latched to the latching rims, respectively.

The secondary cover may have a fixing hole penetrated through the secondary cover to allow an upper portion of a bottle-shaped container mounted inside the receiving part to be inserted into and fixed to the hole.

The secondary cover may have a bent portion formed downwards at one end thereof.

With such a construction described above, the glove box in accordance with the present invention can prevent received articles within the receiving part of the glove box from being ejected to the outside through the upper portion of the receipt part due to the vibration, the collision, and the like during driving.

BRIEF DESCRIPTION OF THE DRAWINGS

The foregoing and other objects and features of the present invention will be more clearly understood from the following detailed description taken in conjunction with the accompanying drawings, in which.

DESCRIPTION OF THE PREFERRED EMBODIMENTS

Preferred embodiments will now be described in detail with reference to the accompanying drawings.

Figure 1:
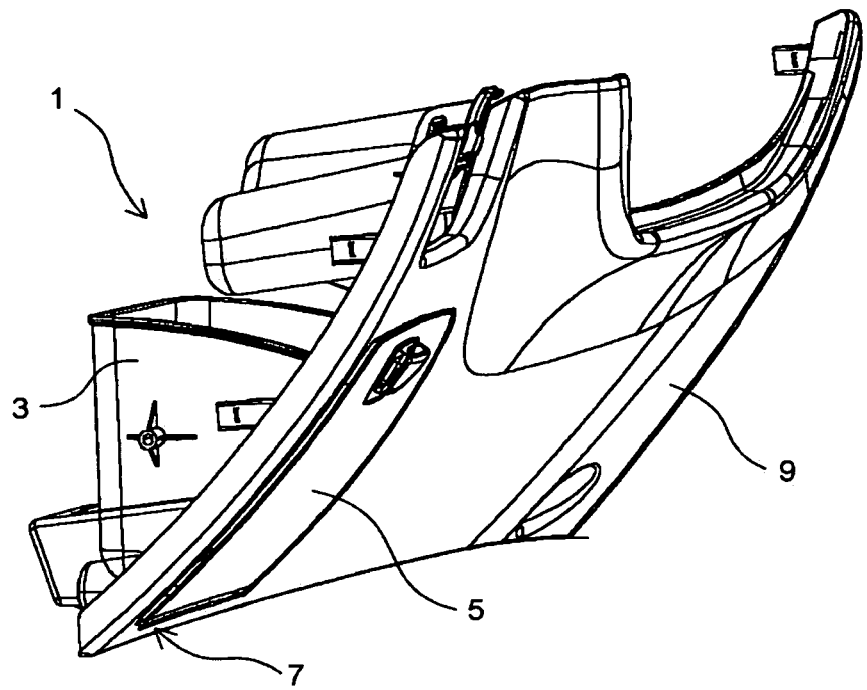
FIG. 1 is a perspective view illustrating a conventional glove box equipped to an instrument panel.
Figure 2:
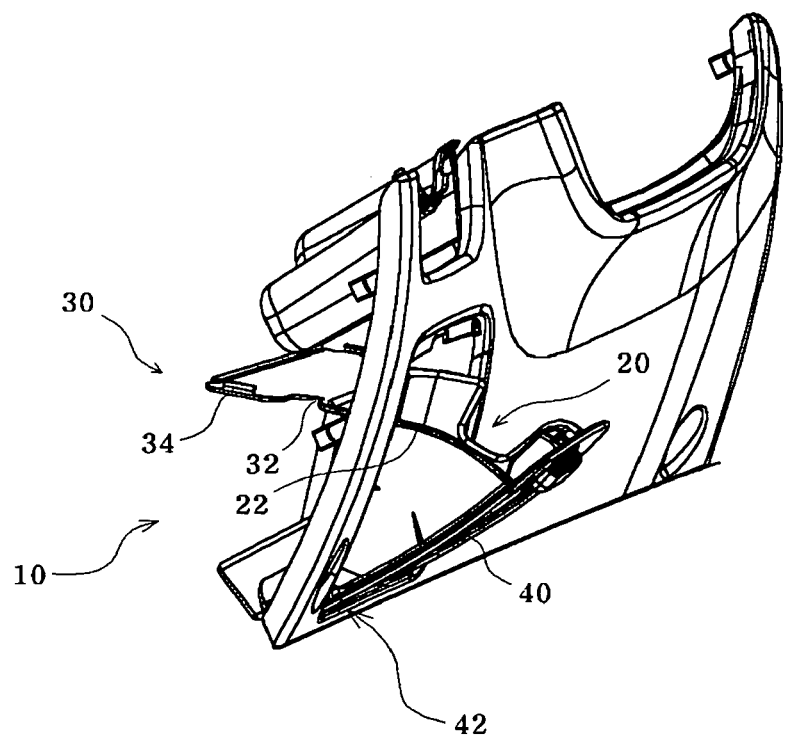
FIG. 2 is a perspective view illustrating a glove box for preventing received articles from being ejected therefrom in accordance with a first embodiment of the present invention, of which a secondary cover is opened.
Figure 3:
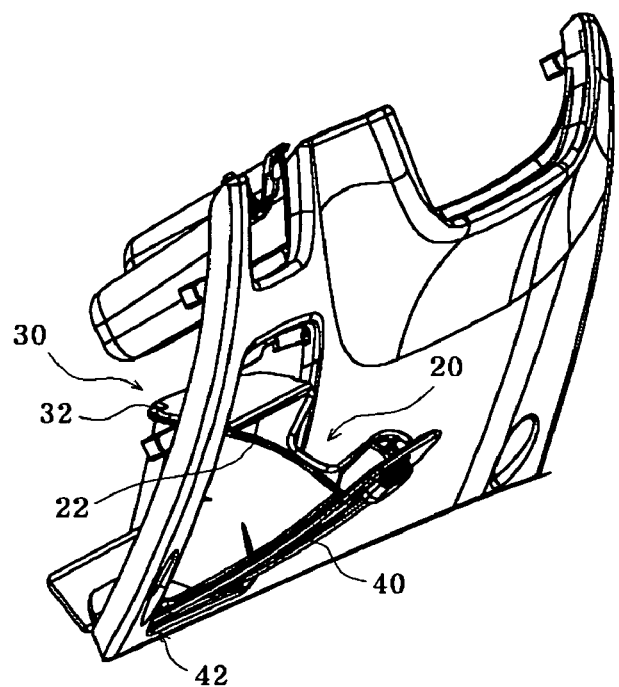
FIG. 3 is a perspective view illustrating a closed state of the secondary cover of FIG. 2.
Figure 4:
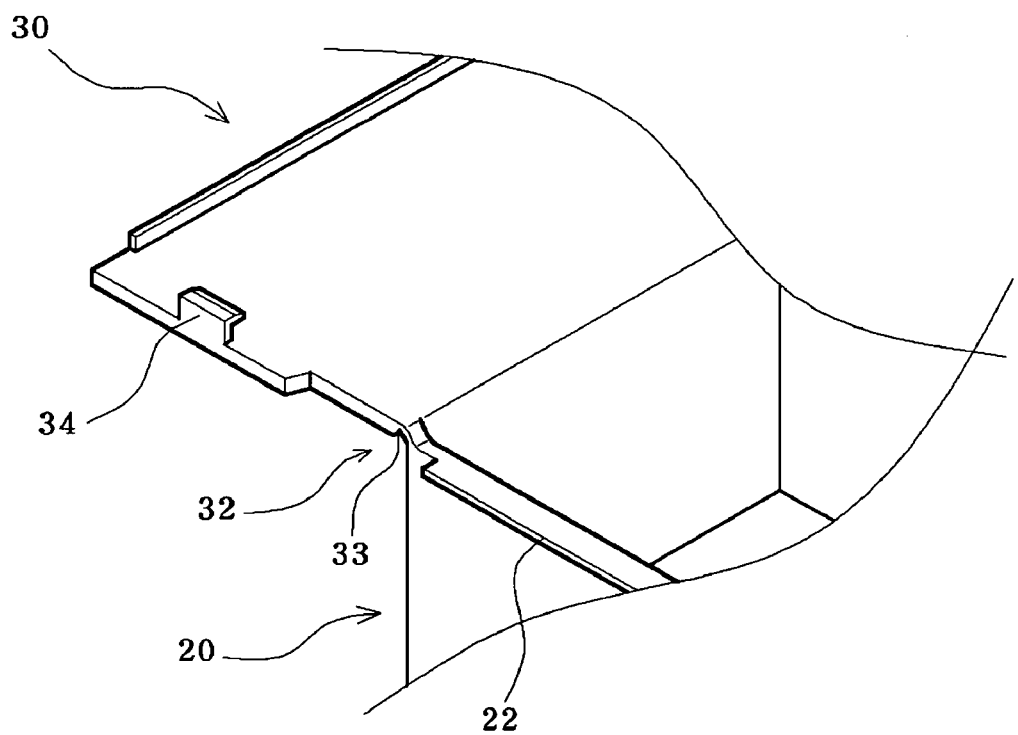
FIG. 4 is a detailed perspective view illustrating the secondary cover of FIG. 2.
Figure 5:
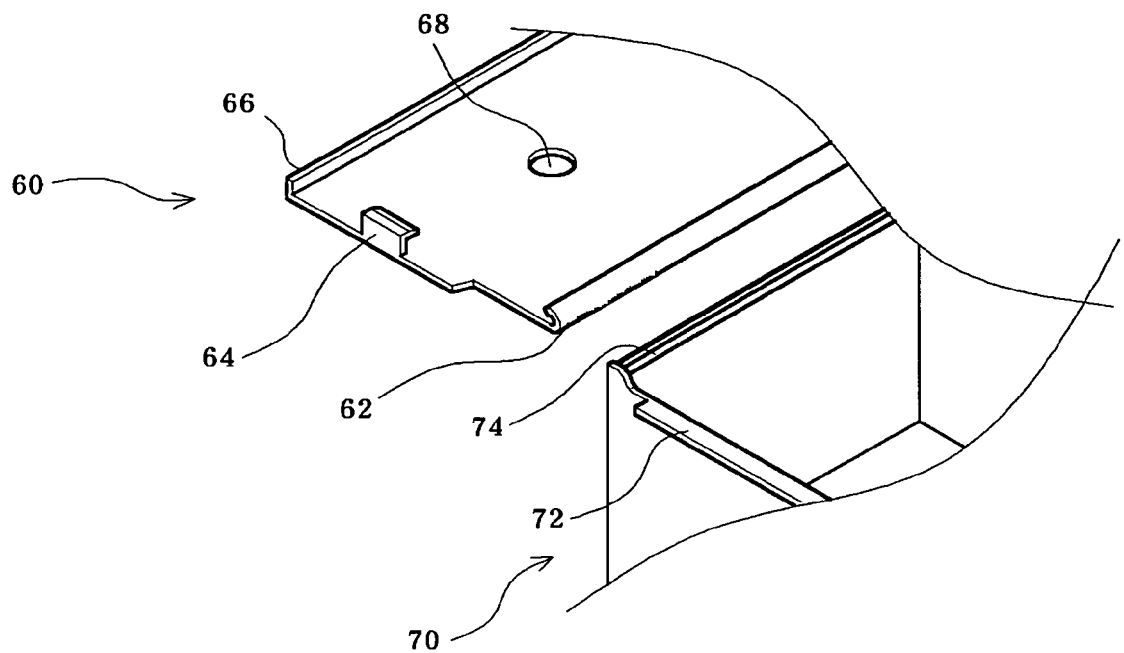
FIG. 5 is an exploded perspective view illustrating a glove box for preventing received articles from being ejected therefrom accordance with a second embodiment of the present invention.
Figure 6:
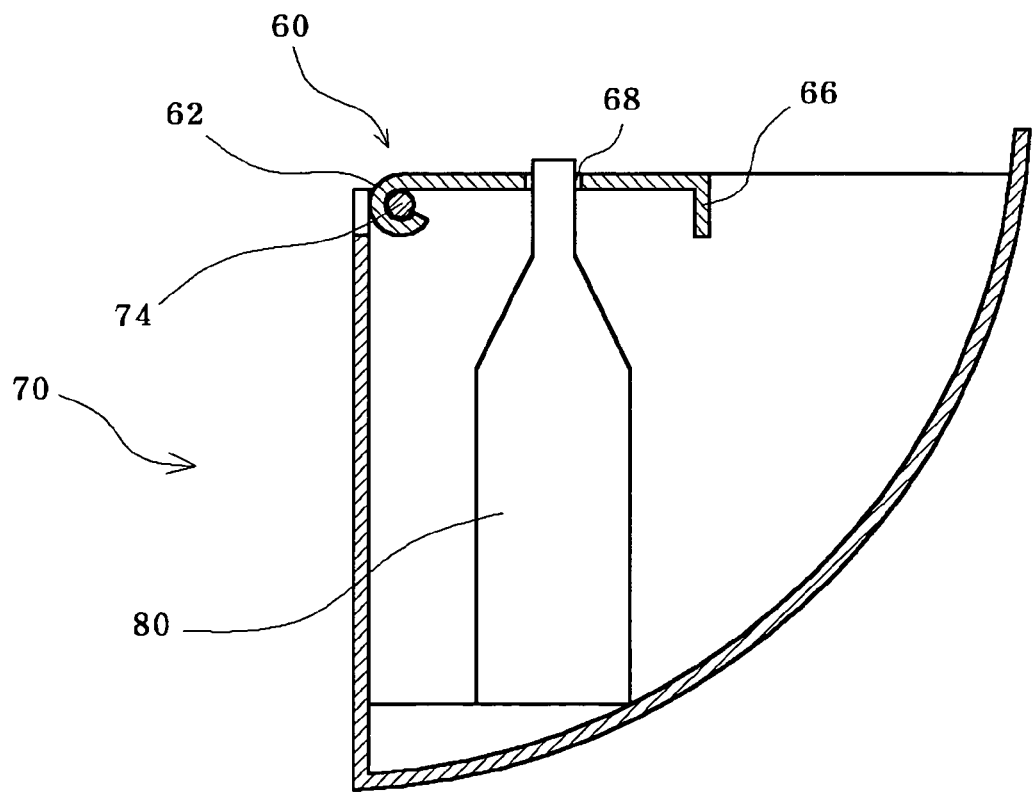
FIG. 6 is a sectional side elevation illustrating a usage of the glove box of FIG. 5.

FIGS. 2 and 3 are perspective views illustrating an opened state and a closed state of a secondary cover of a glove box for preventing received articles from being ejected therefrom accordance with a first embodiment of the present invention, respectively. FIG. 4 is a detailed perspective view illustrating the secondary cover of FIG. 2. FIG. 5 is an exploded perspective view illustrating a glove box for preventing received articles from being ejected therefrom accordance with a second embodiment of the invention, and FIG. 6 is a sectional side elevation illustrating a usage of the glove box of FIG. 5.

A glove box 10 in accordance with the first embodiment of the invention comprises a receiving part 20 having an inner receiving space formed in the receiving part 20, latching rims 22 protruded at both sides of the upper end of the receiving part 20, and a secondary cover 30 integral to the receiving part 20 to cover an upper portion of the receiving part 20 with an aid of the latching rims 22.

The secondary cover 30 is connected to the receiving part 20 via a hinge connection 32, which has bent grooves 33 formed at both outer sides of the hinge connection 32, as shown in FIG. 4, in order to ensure easy bending of the hinge connection 32.

The secondary cover 30 has hook-shaped elastic protrusions 34 formed at both sides thereof to be elastically latched to the latching rims 22, respectively.

The receipt part 20 is provided, at a front side thereof, with a front cover 40 having a grip formed on the front cover 40. The glove box 10 having the construction as described above is equipped to an instrument panel 50 by means of a hinge 42.

Referring to FIGS. 5 and 6, a glove box in accordance with a second embodiment will be described as follows. In accordance with the second embodiment, a secondary cover 60 of a glove box has a hinge holder 62 formed at one end of the secondary cover 60 contacting a receiving part 70 to be hinged to the secondary cover 60. The hinge holder 62 is formed by winding the one end of the secondary cover 60 while defining an insertion space, which is opened at one side of the hinge holder 62 to allow a fastening bar 74 to be provided to the hinge holder 62 therethrough.

The secondary cover 60 has elastic protrusions 64 formed at both sides thereof towards the receipt part 70, and a bent portion 66 formed downwards towards a receipt space of the receipt part 70 at one end of the secondary cover 60 opposite to the hinge holder 62.

The secondary cover 60 has a fixing hole 68 penetrated there through, and allows an upper portion of a bottle-shaped container 80 mounted to an inside of the receipt part 70 to be inserted into and fixed to the fixing hole 68.

The receipt part 70 is provided at an upper end of the receipt part with the fastening bar 74 in the longitudinal direction such that the hinge holder 62 of the secondary cover 60 can be hinged to the fastening bar 74.

The receipt part 70 is also provided with latching rims 72 protruded at both sides of the upper end of the receipt part 70, such that the elastic protrusions 64 of the secondary cover 60 are engaged with the latching rims 72, and thus latched to the receiving part 70.

Operation of the glove box in accordance with the first embodiment of the present invention will now be described hereinafter.

The secondary cover 30 integral to the receipt part 20 is rotated about the hinge connection 32, and covers the upper portion of the receiving part 20.

At this time, due to the bending grooves 33 of the hinge connection 32, hinge movement of the secondary cover 30 can be easily performed.

The elastic protrusions 34 of the secondary cover 30 are latched to the latching rims 22 of the receiving part 20, so that the secondary cover 30 is latched to the upper end of the receiving part 20.

Accordingly, as shown in FIG. 3, when the glove box 10 is opened in the front side thereof, the secondary cover 30 constructed as described above can cover a rear side of the receiving part, which is not exposed to the outside of the instrument panel 40.

With such a mounting construction, in the event when articles received within the receiving part 20 is forced upward due to impact caused by vibration, collision, and the like during driving, these articles are shielded by the secondary cover 30 provided to the upper portion of the receiving part 20, and prevented from being ejected to the outside of the receiving part 20.

Moreover, in accordance with the second embodiment of the invention, the secondary cover 60 is provided independent from the receiving member 70, and coupled to the receiving member 70 by allowing the hinge holder 62 of the secondary cover 60 to catch the fastening bar 74 provided to the upper end of the receiving part 70.

With the construction as described above, the secondary cover 60 can be detachably coupled to the receiving part 70, and thus can be utilized according to user's selection, thereby satisfying user's fondness.

Furthermore, with the bent portion 66, the secondary cover 60 can more effectively prevent the received articles from being ejected from the receiving part 70, thereby ensuring a more stable receiving structure.

When the bottle 80 is kept in the receiving part 70 by means of the fixing hole 68 formed through the secondary cover 60, the fixing hole 68 suppresses the movement of the bottle 80, thereby preventing noise and fracture of the bottle caused by the movement of the bottle 80.

As apparent from the above description, the glove box in accordance with the present invention has the secondary cover provided to the upper portion of the receiving part, so that the articles received within the receiving part is prevented from being ejected to the outside through the upper portion of the receiving area, thereby providing enhanced safety of the received articles, and enhancing satisfaction of the customers.

It should be understood that the embodiments and the accompanying drawings as described above have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A glove box for preventing received articles from being ejected from the glove box, comprising:
    a receiving part opened or closed in a front side of the glove box about a hinge part provided at a lower portion of the glove box, and having an inner receiving space formed in the receiving part to receive articles;
    a front cover formed on a front side of the receiving part and forming a substantial continuation of an instrument panel front surface; and
    a secondary cover to cover a rear portion of an upper side of the glove box in order to prevent the received articles from being ejected from the receiving part,
    wherein the secondary cover remains behind the front surface of the instrument panel when the glove box is opened.

2. The glove box according to claim 1, wherein the secondary cover is integrally formed to the receiving part by injection molding, and includes a hinge connection having bent grooves formed at both outer sides of the secondary cover, such that the secondary cover rotates about the hinge connection to cover the one side of the upper portion of the glove box.

3. The glove box according to claim 1, wherein the receiving part has a fastening bar provided in the longitudinal direction to an upper end of the receiving part, and the secondary cover has a hinge holder formed by winding one end of the secondary cover to define an insertion space opened at one side of the hinge holder, such that the hinge holder of the secondary cover can be hinged to the fastening bar.

4. The glove box according to claim 1, wherein the receiving part has latching rims protruded at both sides of the receiving part, and the secondary cover has hook-shaped elastic protrusions formed at both sides of the secondary cover to be elastically latched to the latching rims, respectively.

5. The glove box according to claim 1, wherein the secondary cover has a fixing hole penetrated through the secondary cover to allow an upper portion of a bottle-shaped container mounted inside the receiving part to be inserted into and fixed to the hole.

6. The glove box according to claim 1, wherein the secondary cover has a bent portion formed downwards at one end thereof.

* * * * *